(12) United States Patent
Bi et al.

(10) Patent No.: US 8,331,941 B2
(45) Date of Patent: Dec. 11, 2012

(54) METHOD OF PROVIDING MESSAGES TO A MOBILE UNIT ON A FORWARD LINK

(75) Inventors: Qi Bi, Morris Plains, NJ (US); Terry Si-Fong Cheng, Singapore (SG); Frances Jiang, Whippany, NJ (US); Ramakrishna Vishnuvajjala, Bridgewater, NJ (US); Tomas S. Yang, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 617 days.

(21) Appl. No.: 11/125,980

(22) Filed: May 10, 2005

(65) Prior Publication Data

US 2006/0258357 A1 Nov. 16, 2006

(51) Int. Cl.
*H04W 36/00* (2009.01)

(52) U.S. Cl. ........ 455/439; 455/436; 455/442; 370/331; 370/332

(58) Field of Classification Search .......... 455/436–439, 455/444; 370/331, 332
See application file for complete search history.

(56) References Cited

U.S. PATENT DOCUMENTS

| | | | | |
|---|---|---|---|---|
| 5,175,867 A * | 12/1992 | Wejke et al. | ................. | 455/439 |
| 5,323,446 A * | 6/1994 | Kojima et al. | ................ | 455/437 |
| 5,657,375 A * | 8/1997 | Connolly et al. | ............. | 455/436 |
| 5,883,888 A * | 3/1999 | St-Pierre | ........................ | 370/331 |
| 5,920,817 A * | 7/1999 | Umeda et al. | ................. | 455/437 |
| 6,507,572 B1 * | 1/2003 | Kumar et al. | ................. | 370/335 |
| 6,549,787 B1 * | 4/2003 | Ravi | ................................. | 455/525 |
| 6,633,554 B1 * | 10/2003 | Dalal | ............................. | 455/438 |
| 6,708,030 B1 * | 3/2004 | Horikawa | ..................... | 455/436 |
| 6,757,520 B2 * | 6/2004 | Attar et al. | .................. | 455/63.1 |
| 7,054,632 B2 * | 5/2006 | Attar et al. | .................... | 455/436 |
| 7,151,934 B2 * | 12/2006 | Nishimura et al. | ........... | 455/442 |
| 2003/0016648 A1 * | 1/2003 | Lindsay et al. | ............... | 370/347 |
| 2003/0211848 A1 * | 11/2003 | Rajkotia et al. | .............. | 455/436 |
| 2003/0224786 A1 * | 12/2003 | Lee et al. | .................... | 455/432.1 |
| 2004/0109425 A1 * | 6/2004 | Scribano et al. | ............. | 455/436 |
| 2004/0184423 A1 * | 9/2004 | Tiedmann et al. | ............ | 370/331 |
| 2004/0184424 A1 * | 9/2004 | Shibata et al. | ................ | 370/331 |
| 2005/0124345 A1 * | 6/2005 | Laroia et al. | .................. | 455/437 |
| 2005/0250499 A1 * | 11/2005 | Lee et al. | ..................... | 455/437 |
| 2005/0272426 A1 * | 12/2005 | Yang et al. | .................... | 455/436 |
| 2006/0035639 A1 * | 2/2006 | Etemad et al. | ................ | 455/436 |
| 2006/0291416 A1 * | 12/2006 | Rexhepi et al. | ............... | 370/331 |
| 2007/0036107 A1 * | 2/2007 | Tayloe et al. | .................. | 370/331 |
| 2007/0060165 A1 * | 3/2007 | Black et al. | ................... | 455/450 |
| 2007/0066320 A1 * | 3/2007 | Padovani et al. | ............. | 455/450 |

* cited by examiner

*Primary Examiner* — Rafael Pérez-Gutiérrez
*Assistant Examiner* — Allahyar Kasraian
(74) *Attorney, Agent, or Firm* — Williams, Morgan & Amerson

(57) ABSTRACT

The present invention provides a method of wireless communication using a mobile unit and first and second base stations. The method includes receiving, from the second base station, a notification of a switch of the first base station to the second base station. The method also includes providing at least one message to the second base station in response to receiving the notification.

17 Claims, 2 Drawing Sheets

METHOD OF PROVIDING MESSAGES TO A MOBILE UNIT ON A FORWARD LINK

BACKGROUND OF THE INVENTION

1. Field of the Invention

This invention relates generally to communication systems, and, more particularly, to wireless communication systems.

2. Description of the Related Art

Wireless communication systems typically include a plurality of base stations, or node-Bs, that provide wireless connectivity to one or more mobile units in associated geographical areas that are usually referred to as cells. Exemplary mobile units may include cellular telephones, personal data assistants, smart phones, text messaging devices, laptop computers, and the like. In 1X Evolution, Data Optimized (1XE-VDO) wireless communication system architectures, each mobile unit may transmit messages or signals to one or more active base stations using one or more associated reverse links. Pseudo noise offsets (PN offsets) associated with each of the active base stations are included in an active set list, which is typically stored by a radio network controller coupled to the base stations. Mobile units in a 1XEVDO wireless communication system receive messages and/or signals over a single forward link between the mobile unit and one of the active base stations, which is generally referred to as the serving base station or the serving sector.

Base stations may be added to, or removed from, the active set, a process that is generally referred to as a handoff. For example, a mobile unit may determine that the quality of service of a first reverse link to a first base station has deteriorated and may therefore transmit a request, such as a Route Update message, over the available reverse links to remove the first base station from the active set. The request is forwarded by one or more of the base stations to the radio network controller, which may process the request to remove the first base station from the active set and then forward a Traffic Channel Assignment message to the serving base station. The serving base station may then forward the Traffic Channel Assignment message to the mobile unit over the forward link. The Traffic Channel Assignment message is transmitted over the forward link at a rate determined using a signaling message from the mobile unit that is received on a data request channel of the reverse link. Similarly, the mobile unit may request that a second base station be added to the active set.

The mobile unit will typically select the base station having the strongest forward link as the serving base station. The mobile unit may request a switch of the forward link to other base stations in the active set if, e.g., the quality of the forward link with the current serving base station deteriorates. However, a finite amount of time elapses between transmission of the mobile units request for a switch and the establishment of the forward link between the mobile unit and the new serving base station. Signaling messages may be lost and/or delayed if the signaling message happens to be generated while the switch is underway. For example, if the active set includes first and second base stations, a mobile unit may transmit a Route Update message to add a third base station to the active set. The reverse link to the first base station, which is also the serving base station, has deteriorated and the first base station is not able to receive and/or decode the Route Update message. The second base station receives the Route Update message over the associated reverse link and forwards the Route Update message to a radio network controller. The radio network controller processes the handoff request and sends a Traffic Channel Assignment message to the first (serving) base station. However, the first base station is unable to decode the data request channel of the deteriorated reverse link and so cannot deliver the signaling message to the mobile unit over the forward link.

If the signaling messages are delayed and/or lost during a handoff, the handoff may fail and potentially result in a call being dropped. For example, after sending the Route Update message requesting addition of the third base station to the active set, the mobile unit may recognize that the reverse link to the first base station has deteriorated and may therefore switch to the second base station as the serving base station. The second base station detects the switch and transmits a notification to the radio network controller. However, in order to preserve packet sequencing for transmission of data packets over the forward link, the radio network controller should wait to receive a notification from the original serving sector, i.e. the first base station, before transmitting any traffic or signaling messages to the new serving sector. Since the first base station may not have detected the switch due to the deteriorated reverse link, the first base station may not provided the necessary notification and the attempted switch may time out. Furthermore, if interference causes both the reverse links to the first and second base stations to deteriorate before the third base station can be added to the active set, the call may be dropped.

SUMMARY OF THE INVENTION

The present invention is directed to addressing the effects of one or more of the problems set forth above. In one embodiment of the instant invention, a method of wireless communication using a mobile unit and first and second base stations is provided. The method may include receiving, from the second base station, a notification of a switch of the first base station to the second base station. The method may also include providing at least one message to the second base station in response to receiving the notification.

In another embodiment of the present invention, a method is provided for wireless communication with first and second base stations. The method may include switching the first base station to the second base station and receiving at least one message that is provided in response to at least one notification provided by the second base station.

BRIEF DESCRIPTION OF THE DRAWINGS

The invention may be understood by reference to the following description taken in conjunction with the accompanying drawings, in which like reference numerals identify like elements, and in which.

Figure 1:
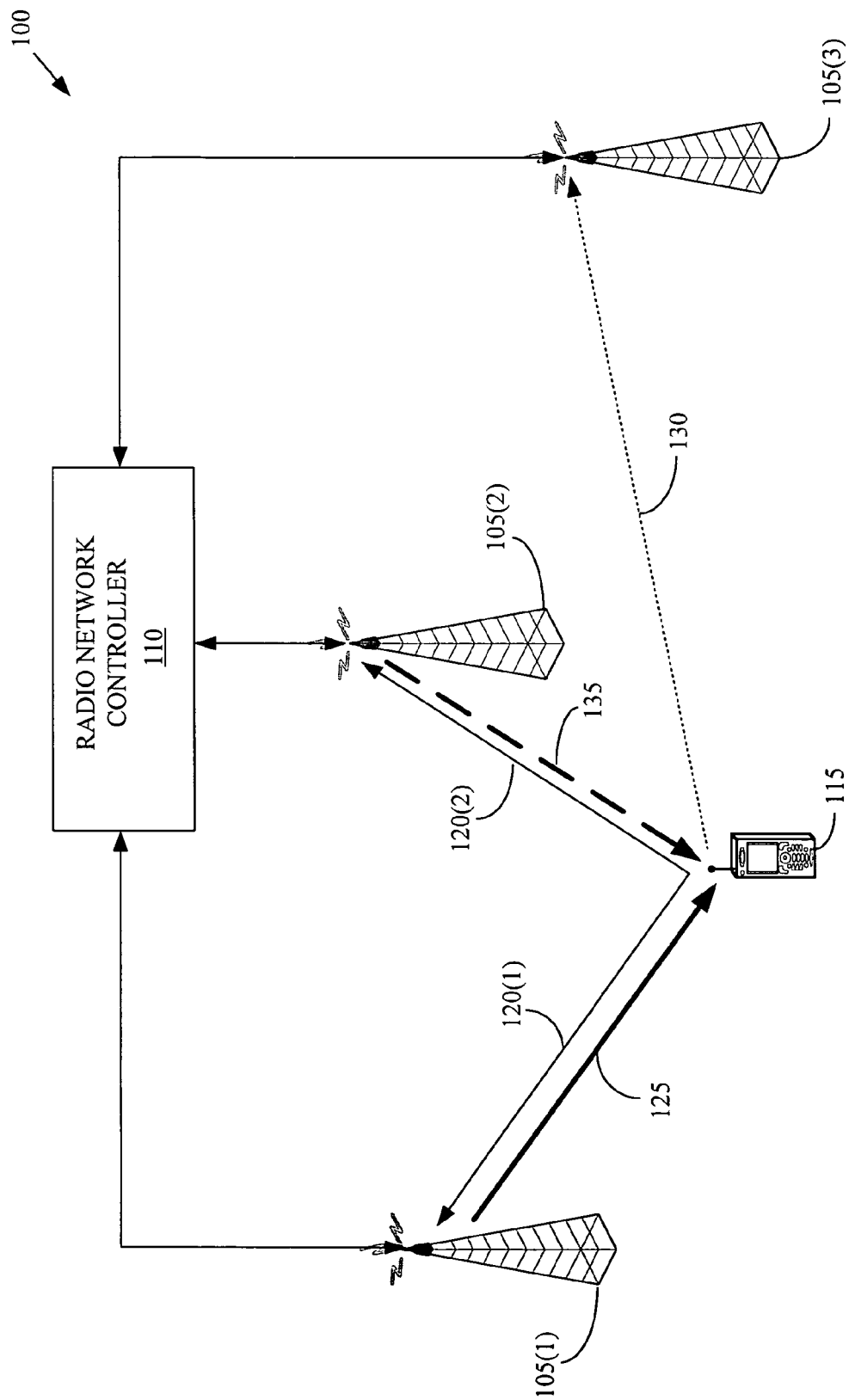
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates one exemplary embodiment of a wireless communication system 100. In the illustrated embodiment, the wireless communication system 100 includes a plurality of base stations 105(1-3) that provide wireless connectivity to associated geographical areas. The base stations 105(1-3) may provide the wireless connectivity according to any desirable protocol including a Code Division Multiple Access (CDMA, CDMA 2000) protocol, an Evolved Data Optimized (EVDO, 1XEVDO) protocol, a Universal Mobile Telecommunication System (UMTS) protocol, a Global System for Mobile communications (GSM) protocol, and like. Although three base stations 105(1-3) are shown in FIG. 1, persons of ordinary skill in the art having benefit of the present disclosure should appreciate that any desirable number of base stations 105(1-3) may be used.

A radio network controller 110 is communicatively coupled to the base stations 105(1-3). In various alternative embodiments, the radio network controller 110 may be communicatively coupled to the base stations 105 (1-3) by a wired connection, a wireless connection, or any combination thereof. Although the radio network controller 110 is shown as a single entity in FIG. 1, persons of ordinary skill in the art should appreciate that portions of the radio network controller 110 may be implemented in any number of entities using hardware, software, or a combination thereof. Radio network controllers are known to persons of ordinary skill in the art and so, in the interest of clarity, only those aspects of the radio network controller 110 that are relevant to the present invention will be described herein.

In the illustrated embodiment, a mobile unit 115 may transmit messages to the base stations 105(1-2) over the reverse links 120(1-2). A single forward link 125 provides messages to the mobile unit 115. The messages may include traffic packets and signaling messages. Traffic packets, which are sometimes referred to as data packets, include information that is intended for the user of the mobile unit 115. For example, traffic packets may include voice information, images, video, data requested from an Internet site, and the like. In contrast, signaling messages are used to provide information intended to be used by the mobile unit 115 and/or other elements of the wireless communication system 100. For example, signaling messages may include data rate messages, configuration messages, setup instructions, switch instructions, handoff instructions, and the like.

The mobile unit 115 may request a handoff by sending the appropriate signaling message, such as a Route Update message, to the radio network controller 110. For example, the mobile unit 115 may request that the base station 105(3) be added to, or removed from, an active set list maintained in the radio network controller 110. If the base station 105(3) is added to the active list, then the base station 105(3) may receive transmissions from the mobile over the reverse link 130. If the base station 105(3) is subtracted from the active list, then the reverse link 130 will be torn down and the base station 105(3) will no longer be able to receive messages from the mobile unit 115. If the base station 105 (3) (i.e. a Pilot) needs to be added to, or removed from, the active list, the radio network controller 110 may send a signaling message, such as a Traffic Channel Assignment message, to the mobile unit 115 using the forward link 125.

The mobile unit 115 may also switch serving base stations. For example, the mobile unit 115 may switch serving base stations based upon channel quality information associated with the forward link 125 and/or the reverse links 120(1-2), 130. In the illustrated embodiment, the mobile unit 115 switches the serving base station from the base station 105(1) to the base station 105(2), which detects the switch and establishes a new forward link 135 to the mobile unit 115. The base station 105(2) also transmits a signaling message containing information indicative of the switch to the radio network controller 110. The radio network controller 110 may then transmit messages to the mobile unit 115 over the forward link 135. In one embodiment, the radio network controller 110 transmits signaling messages to the mobile unit 115 over the forward link 135.

The previous serving base station, i.e. the base station 105(1), may also provide information indicative of the switch to the radio network controller 110. For example, the base station 105(1) may provide frame numbers associated with data frames that were recently transmitted to the mobile unit 115. The radio network controller 110 may then use the frame numbers to maintain continuity of data provided over the traffic channels to the mobile unit 115. Signaling messages, however, do not depend upon information such as frame and/or sequence numbering (at least in part because signaling messages may be short burst messages) and so, in one embodiment, the radio network controller 110 may transmit signaling messages over the forward link 135 substantially before an indication of the switch is received from the previous serving base station 105(1).

Field and lab testing has demonstrated that the new serving base station 105(2) typically detects the switch before the previous serving base station 105(1). Thus, providing messages over the forward link 135 in response to the new serving base station 105(2) detecting the switch may increase the switching speed and may decrease any delays between the time the mobile unit 115 initiates the switch and the time the radio network controller 110 is able to provide messages to the mobile unit 115 over the new forward link 135. In particular, providing signaling messages to the mobile unit 115 over the new forward link 135 using the new serving base station 105(2) may be faster, more efficient, and/or more reliable when the signaling messages are provided substantially before receiving information indicative of the switch from the previous serving base station 105(1). Providing signaling messages to the mobile unit 115 over the new forward link 135 using the new serving base station 105(2) may also reduce the likelihood that handoffs may fail and/or the call may be dropped.

Figure 2:
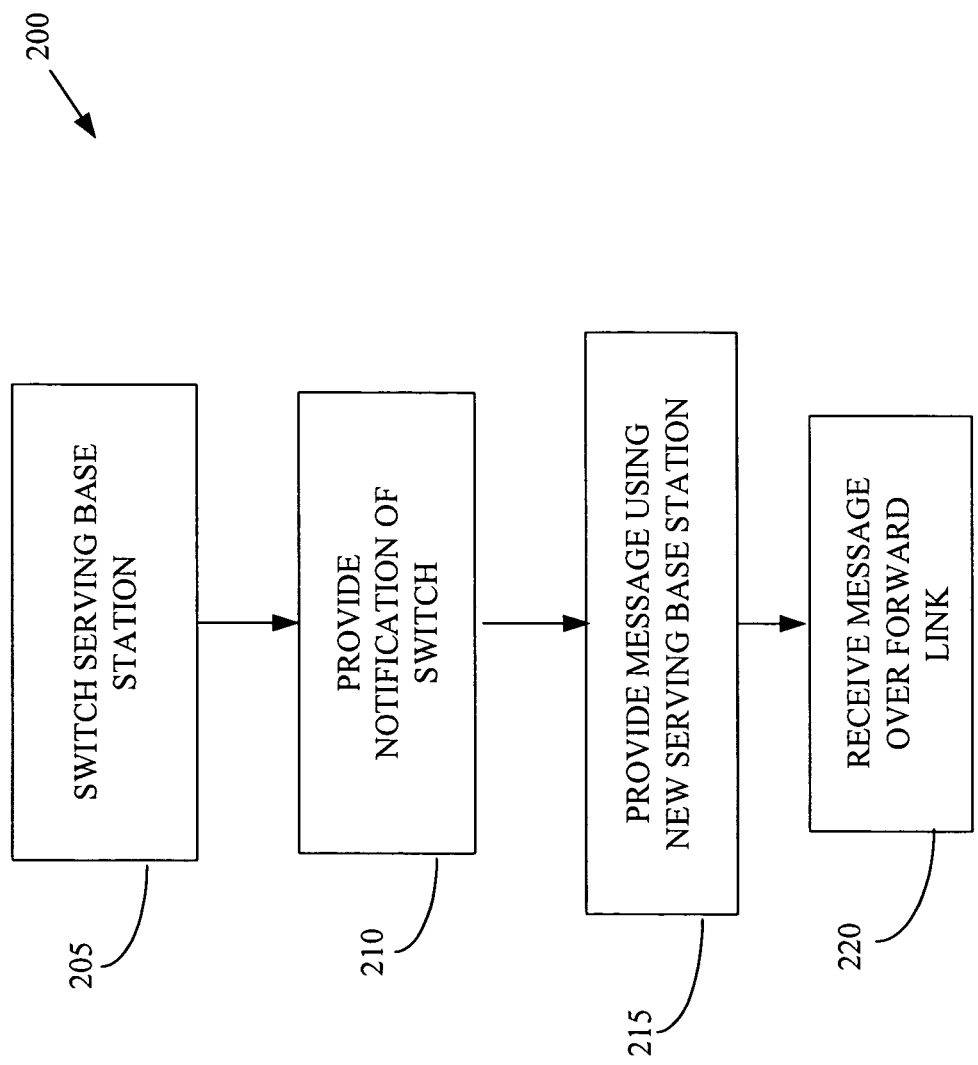
FIG. 2 conceptually illustrates one exemplary embodiment of a method of providing messages to a mobile unit over a forward link, in accordance with the present invention.

FIG. 2 conceptually illustrates one exemplary embodiment of a method 200 of providing messages to a mobile unit over a forward link. In the illustrated embodiment, the serving base station is switched (at 205) from a first base station to a second base station. For example, as discussed above, a mobile unit may switch the serving base station from the first base station to the second base station. The second base station provides (at 210) a notification of the switch to, for example, a radio network controller in response to detecting the switch. Messages are provided (at 215) using the new serving base station.

In one embodiment, signaling messages are provided substantially before receiving an indication of the switch from the first base station. The messages are then received (at 220) over a forward link between the serving base station and the mobile unit.

The method 200 may be implemented using hardware, software, or any combination thereof. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving, at a radio network controller and from a second base station, a notification that the second base station has detected that a mobile unit has switched its serving base station from a first base station to the second base station; and
   providing, from the radio network controller, at least one signaling message to the second base station for transmission to the mobile unit in response to receiving the notification, wherein the radio network controller provides said at least one signaling message before the radio network controller receives, from the first base station, information indicating at least one of a sequence number or a frame number, wherein the sequence number or frame number is associated with at least one data frame previously transmitted to the mobile unit.

2. The method of claim 1, wherein receiving the notification comprises receiving the notification in response to detecting, at the second base station, that the mobile unit has switched serving base stations.

3. The method of claim 1, wherein providing said at least one signaling message comprises providing at least one Traffic Channel Assignment message to the second base station for transmission to the mobile unit over a forward link between the second base station and the mobile unit.

4. The method of claim 1, wherein providing said at least one signaling message comprises providing said at least one signaling message to the mobile unit over a forward link between the second base station and the mobile unit established in response to the second base station detecting that the mobile unit has switched its serving base station to the second base station.

5. The method of claim 1, comprising switching the mobile unit's serving base station from the first base station to the second base station.

6. The method of claim 5, wherein switching the mobile unit's serving base station to the second base station comprises establishing a forward link between the second base station and the mobile unit.

7. The method of claim 6, comprising providing, from the radio network controller, said at least one data frame to the second base station after receiving, from the first base station, said at least one of the sequence number or the frame number, and wherein providing said at least one-data frame comprises providing said at least one data frame over the forward link between the second base station and the mobile unit in response to switching the mobile unit's serving base station from the first base station to the second base station, continuity of said at least one-data frame with at least one prior data frame transmitted by the first base station being preserved using said at least one of the sequence number or the frame number.

8. A method, comprising:
   receiving, at a mobile unit, at least one prior data frame from a first base station, said at least one prior data frame being associated with at least one of a sequence number or a frame number;
   switching the mobile unit's serving base station from the first base station to a second base station;
   receiving at least one signaling message from the second base station, wherein the mobile unit receives said at least one signaling message before a radio network controller receives information indicating at least one of the sequence number or the frame number from the first base station, and wherein said at least one signaling message is provided in response to the second base station providing at least one notification to the radio network controller indicating that the second base station has detected that the mobile unit switched serving base stations.

9. The method of claim 8, wherein switching the mobile unit's serving base station from the first base station to the second base station comprises switching the mobile unit's serving base station from the first base station to the second base station based on a quality of service associated with the first base station.

10. The method of claim 8, wherein receiving said at least one signaling message comprises receiving at least one Traffic Channel Assignment message.

11. The method of claim 8, comprising establishing a forward link with the second base station.

12. The method of claim 11, comprising receiving at least one new data frame over the forward link after the radio network controller receives the information indicating at least one of the sequence number or the frame number from the first base station, continuity of said at least one new data frame with said at least one prior data frame being preserved using the information indicating at least one of the sequence number or the frame number-provided by said at least one first base station.

13. A method, comprising:
providing, from a mobile unit, a notification that the mobile unit is switching serving base stations from a first base station to a second base station;
receiving, at the mobile unit, at least one signaling message from the second base station, wherein the mobile unit receives said at least one signaling message after the second base station has informed a radio network controller that it has detected the switch and before the radio network controller has received information from the first base station indicating at least one of a sequence number or a frame number associated with at least one prior data frame.

14. The method of claim 13, wherein providing the notification to the first and second base stations comprises providing the notification to the first and second base stations in response to the mobile unit switching its serving base station from the first base station to the second base station.

15. The method of claim 13, wherein receiving said at least one signaling message comprises receiving at least one Traffic Channel Assignment message.

16. The method of claim 13, comprising establishing a forward link between the mobile unit and the second base station.

17. The method of claim 16, comprising receiving at least one new data frame from the radio network controller, said at least one new data frame being provided after the radio network controller receives the information indicating at least one of the sequence number or the frame number from the first base station, wherein receiving said at least one new data frame comprises receiving at least one new data frame over the forward link, continuity of said at least one new data frame with said at least one prior data frame being preserved using the information indicating at least one of the sequence number or the frame number provided by said at least one first base station.

* * * * *